(12) United States Patent
Yu et al.

(10) Patent No.: US 12,235,614 B2
(45) Date of Patent: Feb. 25, 2025

(54) MOLDING SYSTEM FOR FABRICATING FIBER REINFORCEMENT POLYMER COMPOSITE ARTICLE AND MOLDING METHOD THEREOF

(71) Applicant: CORETECH SYSTEM CO., LTD., Zhubei (TW)

(72) Inventors: Chi-Hua Yu, New Taipei (TW); Mao-Ken Hsu, Tongxiao Township (TW); Yi-Wen Chen, Zhubei (TW); Li-Hsuan Shen, Zhubei (TW); Chih-Chung Hsu, Zhubei (TW); Chia-Hsiang Hsu, Zhubei (TW); Rong-Yeu Chang, Hsinchu (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 471 days.

(21) Appl. No.: 17/654,397

(22) Filed: Mar. 10, 2022

(65) Prior Publication Data
US 2023/0115965 A1   Apr. 13, 2023

Related U.S. Application Data

(60) Provisional application No. 63/254,700, filed on Oct. 12, 2021.

(51) Int. Cl.
*G05B 13/02* (2006.01)
*B29C 70/22* (2006.01)
(Continued)

(52) U.S. Cl.
CPC .......... *G05B 13/027* (2013.01); *B29C 70/22* (2013.01); *B29C 70/54* (2013.01);
(Continued)

(58) Field of Classification Search
CPC ....... G05B 13/027; B29C 70/22; B29C 70/54; B29K 2105/0845; B29K 2307/04; B29K 2309/08
See application file for complete search history.

(56) References Cited

U.S. PATENT DOCUMENTS 6,277,771 B1 * 8/2001 Nishimura ........... D03D 15/573
442/256
2014/0316551 A1 * 10/2014 Ellis ....................... B29C 70/50
700/127
(Continued)

*Primary Examiner* — Mohammad Ali
*Assistant Examiner* — Dhruvkumar Patel
(74) *Attorney, Agent, or Firm* — MUNCY, GEISSLER, OLDS & LOWE, P.C.

(57) ABSTRACT

The present disclosure provides a molding system for fabricating a FRP composite article. The molding system includes a detector, a resin dispenser, a processing module, and a molding machine. The detector is configured to capture a graph of a woven fiber from a top view. The resin dispenser is configured to provide a resin to the woven fiber to form a FRP. The processing module is configured to receive the graph and a plurality of parameters of the FRP. The processing module includes a CNN model, and is configured to use the CNN model to obtain a plurality of predicted mechanical properties of the FRP according to the graph and the plurality of parameters of the FRP. The molding machine is configured to mold the FRP to fabricate the FRP composite article according to the plurality of predicted mechanical properties.

17 Claims, 7 Drawing Sheets

(51) Int. Cl.
  *B29C 70/54*      (2006.01)
  *B29K 105/08*     (2006.01)
  *B29K 307/04*     (2006.01)
  *B29K 309/08*     (2006.01)

(52) U.S. Cl.
  CPC .............. *B29K 2105/0845* (2013.01); *B29K 2307/04* (2013.01); *B29K 2309/08* (2013.01)

(56) References Cited

U.S. PATENT DOCUMENTS

| | | | |
|---|---|---|---|
| 2020/0027206 A1* | 1/2020 | Szarski | G06N 3/08 |
| 2021/0238801 A1* | 8/2021 | Mikoshiba | D21G 9/0027 |
| 2021/0299979 A1* | 9/2021 | Hatta | B29C 70/462 |
| 2021/0394464 A1* | 12/2021 | Bendel | B29C 70/54 |
| 2023/0280311 A1* | 9/2023 | Tanigami | G01N 29/0654 |
| | | | 702/39 |
| 2023/0334195 A1* | 10/2023 | Moon | G01N 33/44 |

* cited by examiner

MOLDING SYSTEM FOR FABRICATING FIBER REINFORCEMENT POLYMER COMPOSITE ARTICLE AND MOLDING METHOD THEREOF

CROSS-REFERENCE TO RELATED APPLICATIONS

This application claims the benefit of previously-filed provisional application No. 63/254,700, filed Oct. 12, 2021, which is incorporated by reference in its entirety.

TECHNICAL FIELD

The present disclosure relates to a molding system and a molding method, and more particularly, to a molding system and a molding method for fabricating a fiber reinforcement polymer composite article.

DISCUSSION OF THE BACKGROUND

Carbon fiber is a chemical fiber material that has both high strength and high temperature resistance, and is a continuous-fiber material composed of stable continuous-chain carbon molecules with a layered structure. Carbon fiber often appears in modern industry in a form of composite materials, such as a carbon fiber reinforcement polymer (CFRP). The CFRP has a very high strength-to-weight ratio, and is widely used in products that require high strength and rigidity, such as aviation materials, automotive components, sports equipment, etc.

Carbon fiber has different characteristics according to its fiber bundle arrangement. The bundle arrangement can be divided into a unidirectional (UD) arrangement and a woven arrangement. The UD arrangement has greater strength and stability than the woven arrangement. In the woven arrangement, a lamination angle can be designed to meet different requirements.

The CFRP is used to form a CFRP article via a lamination process. During the lamination process, properties of the CFRP vary with deformation caused by a high temperature and a pressure. Therefore, it is desirable to accurately obtain behaviors of the CFRP during the lamination process.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a molding system for fabricating a FRP composite article. The molding system includes a detector, a resin dispenser, a processing module, and a molding machine. The detector is configured to capture a graph of a woven fiber from a top view. The resin dispenser is configured to provide a resin to the woven fiber to form a FRP. The processing module is configured to receive the graph and a plurality of parameters of the FRP. The processing module includes a convolutional neural network (CNN) model, and is configured to use the CNN model to obtain a plurality of predicted mechanical properties of the FRP according to the graph and the plurality of parameters of the FRP. The molding machine is configured to mold the FRP to fabricate the FRP composite article according to the plurality of predicted mechanical properties.

In some embodiments, the molding system further includes a controller. The controller is coupled to the molding machine and configured to control the molding machine using the plurality of predicted mechanical properties to fabricate the FRP composite article.

In some embodiments, the plurality of parameters of the FRP include a material of the resin, a woven angle of the woven fiber, a width of a fiber of the woven fiber, a height of the fiber of the woven fiber, a temperature, and a pressure.

In some embodiments, the plurality of predicted mechanical properties include a Young's modulus, a shear modulus, a Poisson's ratio, and a coefficient of thermal expansion.

In some embodiments, the processing module is further configured to train the CNN model by using a plurality of training sets. Each of the plurality of training sets includes a training graph, a plurality of training parameters, and a plurality of training mechanical properties.

In some embodiments, the molding system further includes an ABAQUS module. The ABAQUS module is configured to generate the plurality of training mechanical properties according to the plurality of training parameters.

In some embodiments, the processing module is configured to input the plurality of training sets to the CNN model to train the CNN model, and obtain a plurality of pseudo-mechanical properties corresponding to the training graph in each of the training sets, respectively, from the CNN model.

In some embodiments, the processing module further includes a comparing model. The comparing model is configured to compare the plurality of training mechanical properties to the plurality of pseudo-mechanical properties, and transmit a plurality of comparing results to the CNN model to train the CNN model.

In some embodiments, the woven fiber is a woven carbon fiber.

In some embodiments, the woven fiber is a woven glass fiber.

Another aspect of the present disclosure provides a molding method for fabricating a FRP composite article. The molding method includes operations of: capturing a graph of a woven fiber from a top view; providing a resin to the woven fiber to form a FRP; obtaining, by a CNN model, a plurality of predicted mechanical properties of the FRP according to the graph and a plurality of parameters of the FRP; and molding the FRP to fabricate the FRP composite article according to the plurality of predicted mechanical properties.

In some embodiments, the molding method further includes an operation of: receiving, by the CNN model, the graph and the plurality of parameters of the FRP.

In some embodiments, the plurality of parameters of the FRP include a material of the resin, a woven angle of the woven fiber, a width of a fiber of the woven fiber, a height of the fiber of the woven fiber, a temperature, and a pressure.

In some embodiments, the molding method further includes an operation of: training the CNN model using a plurality of training sets, wherein each of the plurality of training sets comprises a training graph, a plurality of training parameters, and a plurality of training mechanical properties.

In some embodiments, the molding method further includes an operation of: generating, by an ABAQUS module, the plurality of training mechanical properties according to the plurality of training parameters.

In some embodiments, training the CNN model by using the plurality of training sets includes operations of: inputting the training graph and the plurality of training parameters of each of the plurality of training sets to the CNN model; and obtaining a plurality of pseudo-mechanical properties corresponding to the training graph in each of the plurality of training sets from the CNN model.

In some embodiments, training the CNN model by using the plurality of training sets further includes operations of: comparing the plurality of training mechanical properties to the plurality of pseudo-mechanical properties to generate a plurality of comparing results, and transmitting the plurality of comparing results to the CNN model.

In some embodiments, the woven fiber is a woven carbon fiber.

embodiments, the woven fiber is a woven glass fiber.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
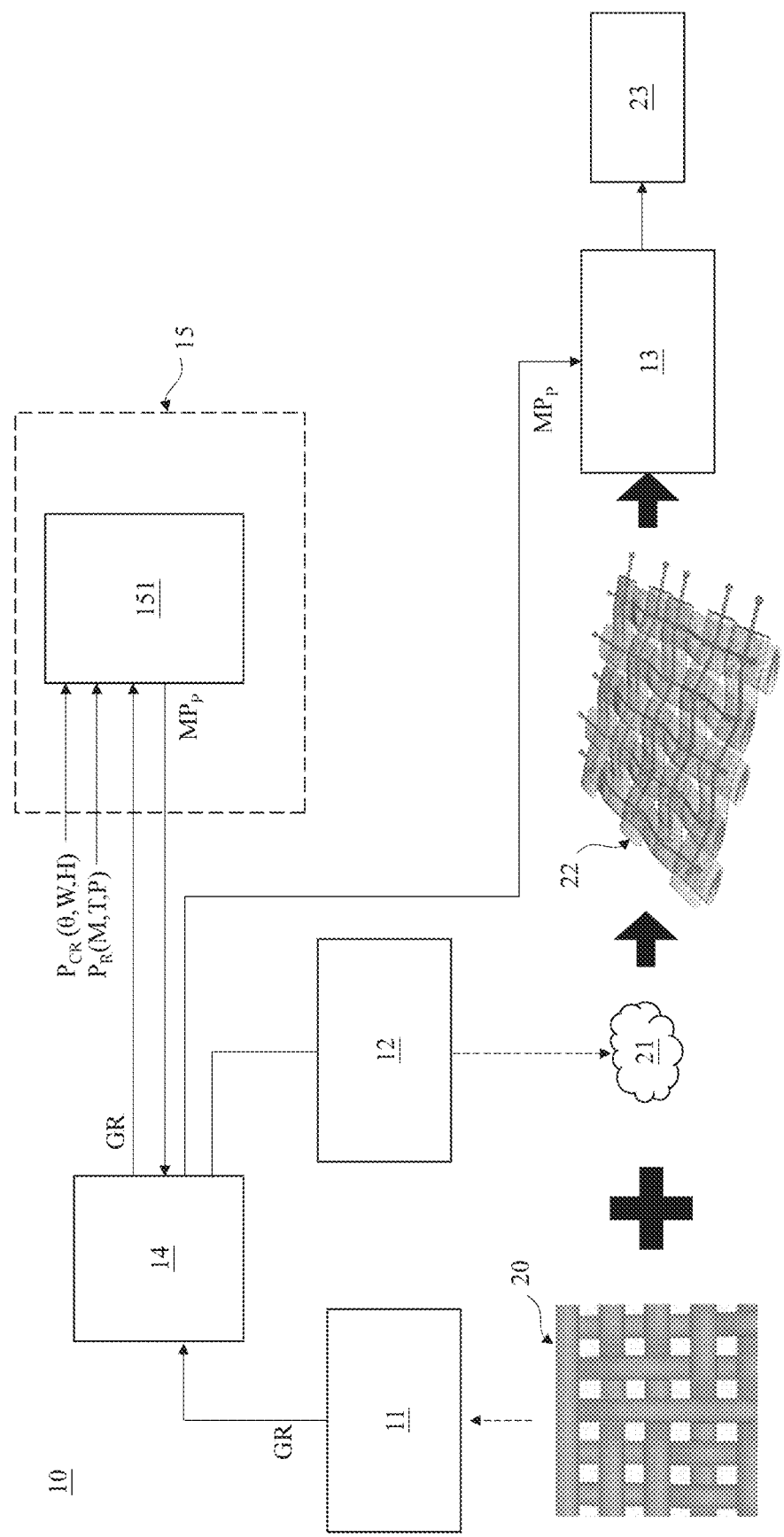
FIG. 1 is a schematic diagram of a molding system according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a molding system 10 according to some embodiments of the present disclosure. The molding system 10 is configured to fabricate a fiber reinforcement polymer (FRP) composite article 23 according to predicted mechanical properties $MP_P$ of a FRP 22. The molding system 10 is configured to obtain the predicted mechanical properties $MP_P$ of the FRP 22, and proceed the FRP 22 to a molding process to form the FRP composite article 23.

The FRP 22 includes a woven fiber 20 and a resin 21. Fibers are woven to form a sheet (i.e., the woven fiber 20), and the resin 21 is deposited in the woven fiber 20 to form the FRP 22. In some embodiments, the FRP 22 is formed by an injection molding process. Based on different orientations of the fiber in the woven fiber 20 and different materials of the resin 21, the FRP 22 can have different mechanical properties. In some embodiments, process parameters of the molding process for forming the FRP composite article 23 have to be modified due to different mechanical properties. Therefore, the molding system 10 predicts the mechanical properties (i.e., the predicted mechanical properties $MP_P$) and provides the predicted mechanical properties to the molding process.

In some embodiments, the woven fiber 20 is a woven carbon fiber. In this embodiment, the FRP 22 is a carbon fiber reinforcement polymer (CFRP), and the FRP composite article 23 is a carbon fiber reinforcement polymer composite article (CFRP composite article).

In other embodiments, the woven fiber 20 is a woven glass fiber. In this embodiment, the FRP 22 is a glass fiber reinforcement polymer, and the FRP composite article 23 is a glass fiber reinforcement polymer composite article.

In some embodiments, the predicted mechanical properties MPP include a Young's modulus E, a shear modulus G, a Poisson's ratio v, and a coefficient of thermal expansion CTE of the FRP 22. It should be noted that the present disclosure is not limited to the predicted mechanical properties MPP provided above. Various suitable predicted mechanical properties MPP which may affect the molding process are within the contemplated scope of the present disclosure.

The molding system 10 includes a detector 11, a resin dispenser 12, a molding machine 13, a controller 14, and a processing module 15. The controller 14 is coupled to the detector 11, the resin dispenser 12, the molding machine 13, and the processing module 15.

The molding system 10 receives the woven fiber 20. The processing module 15 is configured to obtain the predicted mechanical properties $MP_P$ according to a two-dimensional (2D) graph GR of the woven fiber 20, parameters $P_{CR}$ of the woven fiber 20, and parameters $P_R$ of the resin 21. The processing module 15 includes a machine learning model 151 configured to predict the predicted mechanical properties $MP_P$. In some embodiments, the machine learning model 151 is a convolutional neural network (CNN) model. To facilitating understanding, the CNN model 151 represents the machine learning model 151 hereinafter. However, the present disclosure is not limited thereto. In various embodiments, the machine learning model 151 is an artificial neural network.

The detector 11 is configured to capture the graph GR. The graph GR is a two-dimensional graph from a top view of the woven fiber 20. In some embodiments, the detector 11 is a camera.

In some embodiments, the parameters $P_{CR}$ of the woven fiber 20 include a woven angle θ of the woven fiber 20, a width W of a fiber of the woven fiber 20, and a height H of the fiber of the woven fiber 20. In some embodiments, the parameters $P_R$ of the resin 21 include a material M of the resin 21, a temperature T of the injection molding process, and a pressure P of the injection molding process.

The CNN model 151 is trained to be able to predict the predicted mechanical properties $MP_P$. The CNN model 151 is configured to receive the graph GR, the parameters $P_{CR}$, and the parameters $P_R$, and generate the predicted mechanical properties $MP_P$ according to the graph GR, the parameters $P_{CR}$, and the parameters $P_R$. The process of training the CNN model 151 is described with respect to FIG. 2.

In some conventional approaches, the mechanical properties of the FRP 22 are calculated by an ABAQUS module. The ABAQUS module includes an implemented ABAQUS software which is provided by Dassault Systèmes Simulia Corp. The ABAQUS module needs a geometry of the FRP 22 to calculate the mechanical properties thereof. In other words, the ABAQUS module needs a three-dimensional information of the FRP 22 to calculate the mechanical properties. During the molding process, the FRP 22 deforms and thus obtains a different geometry. When the geometry of the FRP 22 changes, the mechanical properties of the FRP 22 change accordingly. Therefore, the ABAQUS module has to calculate again according to the different geometry so as to obtain the mechanical properties corresponding to the deformed FRP 22. However, the calculation performed by the ABAQUS module is time-consuming, and therefore extends a molding cycle duration, increases cost, and decreases efficiency of the molding process.

Compared to the above conventional approaches, the novel molding system 10 of the present disclosure uses the CNN model 151 to replace the ABAQUS model to generate the predicted mechanical properties $MP_P$. The CNN model 151 is trained off-line. Therefore, when on-line, the molding system 10 can skip the lengthy calculation required by the conventional ABAQUS model and obtain the predicted mechanical properties $MP_P$ directly.

Figure 2:
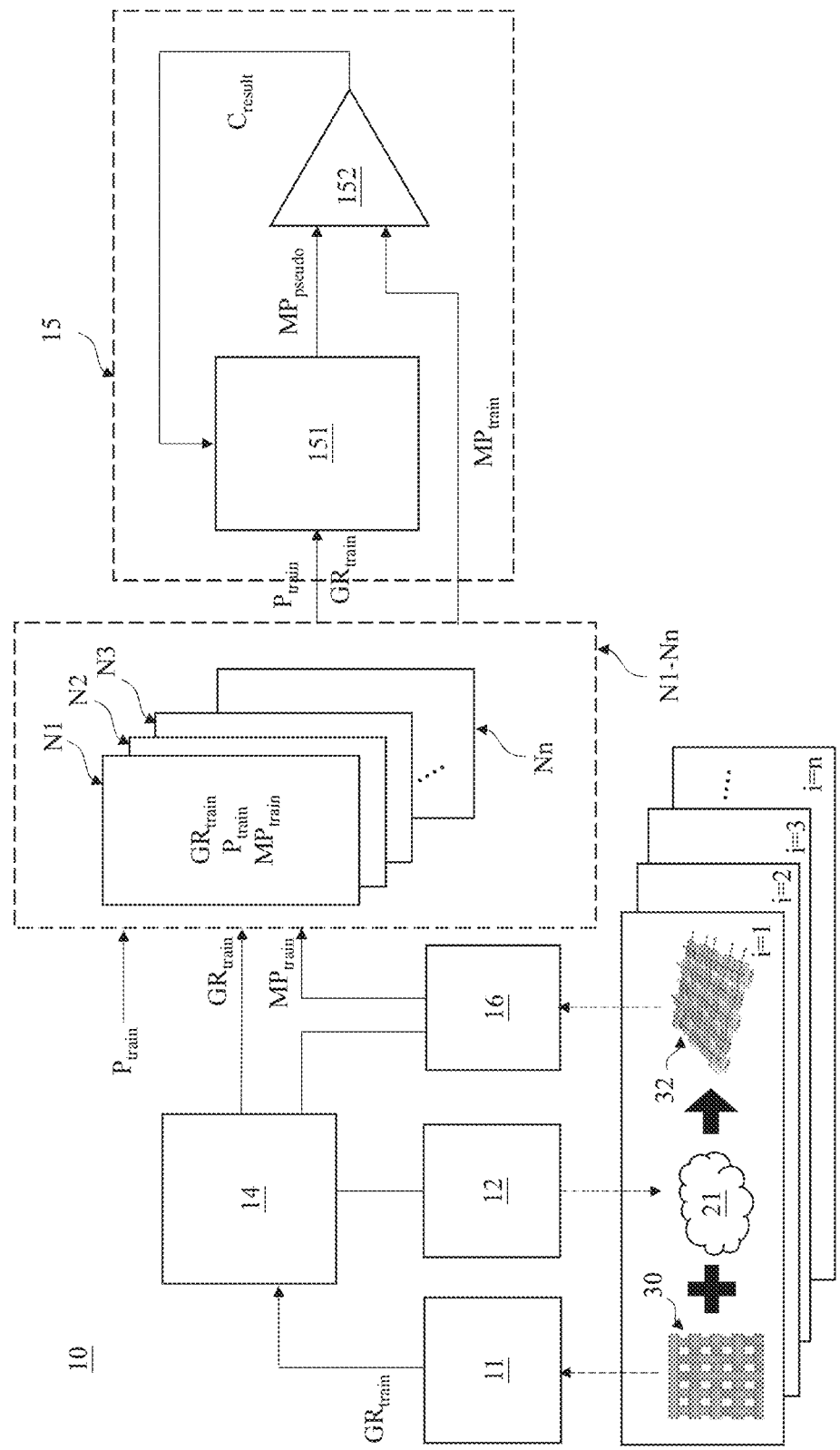
FIG. 2 is a schematic diagram of a molding system according to other embodiments of the present disclosure.

Reference is made to FIG. 2. FIG. 2 is a schematic diagram of a molding system 10 according to some embodiments of the present disclosure. Compared to the molding system in FIG. 1, the molding system 10 is operated off-line and is configured to train the CNN model 151. In FIG. 2, the molding system 10 further includes an ABAQUS module 16, and the processing module 15 further includes a comparing model 152. Some elements of the molding system 10 shown in FIG. 1 are omitted in FIG. 2 to facilitate understanding.

When training the CNN model 151, the processing module 15 is configured to receive a plurality of training sets N1 to Nn, in which n is an integer greater than 1. Each of the training sets N1 to Nn includes a training graph $GR_{train}$, a plurality of training parameters $P_{train}$, and a plurality of training mechanical properties $MP_{train}$.

In some embodiments, each of the training sets N1 to Nn is prepared by performing a training injection molding process on a training woven fiber 30 and a training resin 31. In each of the training sets N1 to Nn, the training graph $GR_{train}$ is captured by the detector 11 from the training woven fiber 30, the training parameters $P_{train}$ of the training injection molding process are provided by an external input signal or the controller 14, and the training mechanical properties $MP_{train}$ of a training FRP 32 are generated by the ABAQUS module 16 according to the training parameters $P_{train}$.

To facilitating understanding, the training woven fiber 30, the training resin 31, and the training FRP 32 are grouped by frames denoted by i=1 to i=n in FIG. 2, and the training woven fiber 30, the training resin 31, and the training FRP 32 in a frame correspond to one of the training sets N1 to Nn. For example, the frame denoted by i=1 corresponds to the training set N1. In other words, a plurality sets of the training woven fiber 30, the training resin 31, and the training FRP 32 are used for training the CNN model 151.

The training parameters $P_{train}$ include a woven angle $θ_{train}$ of the training woven fiber 30, a width $W_{train}$ of a fiber of the training woven fiber 30, a height $H_{train}$ of the fiber of the training woven fiber 30, a material $M_{train}$ of the training resin 31, a temperature $T_{train}$ of the training injection molding process, and a pressure $P_{train}$ of the training injection molding process.

The processing module 15 inputs the training sets N1 to Nn to the CNN model 151 to train the CNN model 151. The CNN model 151 performs a machine learning to establish the ability of predicting the training mechanical properties $MP_{train}$ of the training FRP 32 according to the training sets N1 to Nn.

The CNN model 151 receives the training graph $GR_{train}$ and the training parameters $P_{train}$ of each of the training sets N1 to Nn to generate a plurality of pseudo-mechanical properties $MP_{pseudo}$ of each of the training sets N1 to Nn. Next, the comparing model 152 is configured to compare the pseudo-mechanical properties $MP_{pseudo}$ to the training mechanical properties $MP_{train}$ to generate a comparing result $C_{result}$. The comparing model 152 is further configured to transmit the comparing result $C_{result}$ as a feedback to the CNN model 151 for indicating whether the predicted values of the pseudo-mechanical properties $MP_{pseudo}$ is reliable.

When a difference between the pseudo-mechanical properties $MP_{pseudo}$ and the training mechanical properties $MP_{train}$ is greater than a threshold, the comparing result $C_{result}$ indicates that the CNN model 151 has not been trained sufficiently. In some embodiments, the CNN model 151 need additional training sets for additional learning. In contrast, when the difference between the pseudo-mechanical properties $MP_{pseudo}$ and the training mechanical properties $MP_{train}$ is not greater than the threshold, the comparing result $C_{result}$ indicates that the CNN model 151 had learned to predict the training mechanical properties $MP_{train}$ of the corresponding training FRP 32.

Generally speaking, providing of more training sets to the CNN model 151 results in better learning of the CNN model 151. In a practical molding process, the FRP 22 may have various shapes, and some shapes cause difficulty for the ABAQUS module 16 to calculate the mechanical properties. Under such situation, the ABAQUS module 16 usually generates the mechanical properties with less accuracy. Alternatively, for some challenging shapes, the ABAQUS module 16 cannot provide accurate mechanical properties for the subsequent molding process. In some embodiments, the training FRPs 32 used to generate the training sets N1 to Nn have no challenging shape; therefore, the training mechanical properties $MP_{train}$ generated by the ABAQUS module 16 are all reliable. Consequently, the CNN model 151 can be trained to have the ability to generate the predicted mechanical properties $MP_P$ accurately due to the reliability of the training mechanical properties $MP_{train}$.

Figure 3:
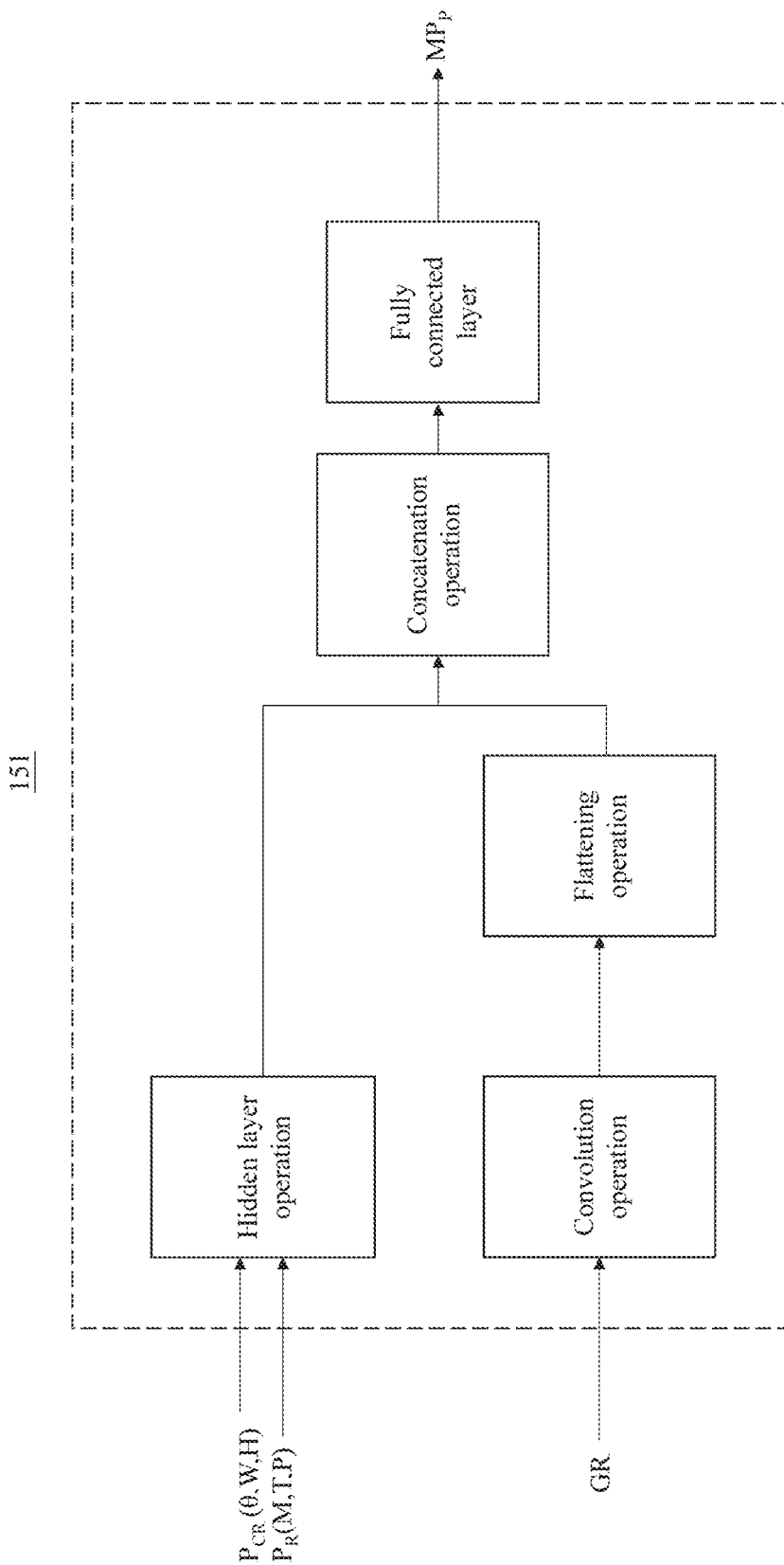
FIG. 3 is a schematic diagram of operations of a CNN model according to some embodiments of the present disclosure.

Reference is made to FIG. 3. FIG. 3 is a schematic diagram of operations of the CNN model 151 according to some embodiments of the present disclosure. While on-line, the CNN model 151 performs a hidden layer operation on the parameters $P_{CR}$ and the parameters $P_R$, and a convolution operation on the graph GR. Next, the CNN model 151 performs a flattening operation on a result of the convolution operation. Then, the CNN model 151 performs a concatenation operation to connect a result of the hidden layer operation to a result of the flattening operation to form a fully connected layer. The CNN model 151 predicts the predicted mechanical properties $MP_P$ according to the fully connected layer.

The operations of the CNN model 151 in FIG. 3 are provided for illustrative purposes. Various operations of the CNN model 151 are within the contemplated scope of the present disclosure.

Figure 4:
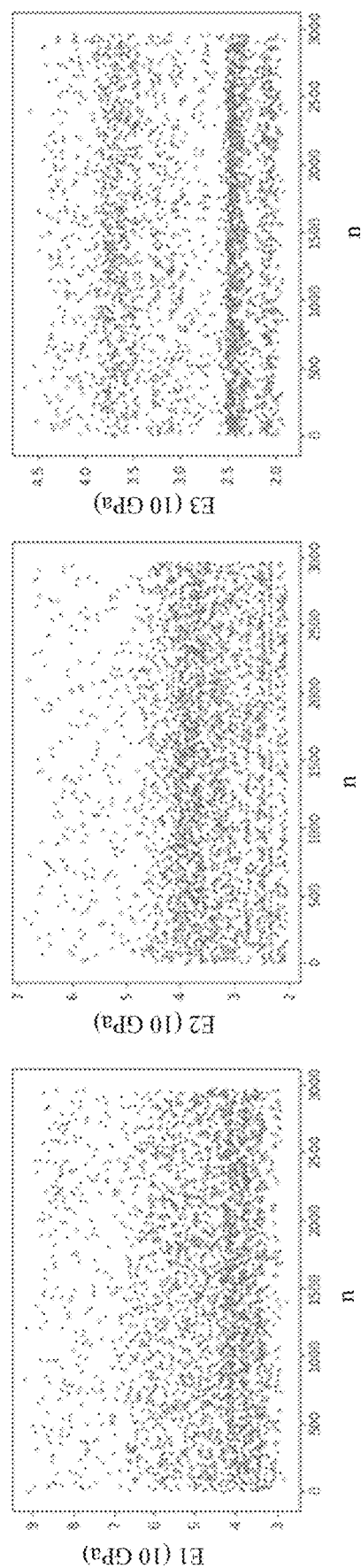
FIG. 4 is schematic diagrams of Young's modulus of pseudo-mechanical properties according to some embodiments of the present disclosure.

Reference is made to FIG. 4. FIG. 4 is schematic diagrams of the Young's modulus E of the pseudo-mechanical properties $MP_{pdeuso}$ according to some embodiments of the present disclosure.

In the embodiment of FIG. 4, 3000 training sets N1 to N3000 are used for training the CNN model 151, and 3000 sets of pseudo-mechanical properties $MP_{pseudo}$ are recorded. To facilitate understanding, only the Young's modulus E of the pseudo-mechanical properties $MP_{pseudo}$ is shown and discussed. The Young's modulus E includes E1, E2 and E3 representing components of the Young's modulus E in x, y and z directions, respectively. FIG. 4 shows a predictable range of the Young's modulus E where the CNN model 151 has the ability to predict. As illustrated in FIG. 4, the CNN model 151 can predict the Young's modulus E between about 30 GPa and about 90 GPa in the x direction, between about 20 GPa and about 70 GPa in the y direction, and between about 18 GPa and about 46 GPa in the z direction. Alternatively stated, the CNN model 151 can predict the Young's modulus E at least within the ranges listed above. However, the present disclosure is not limited thereto. In other embodiments, the CNN model 151 can predict the Young's modulus E in a range other than the ranges mentioned above.

Figure 5:
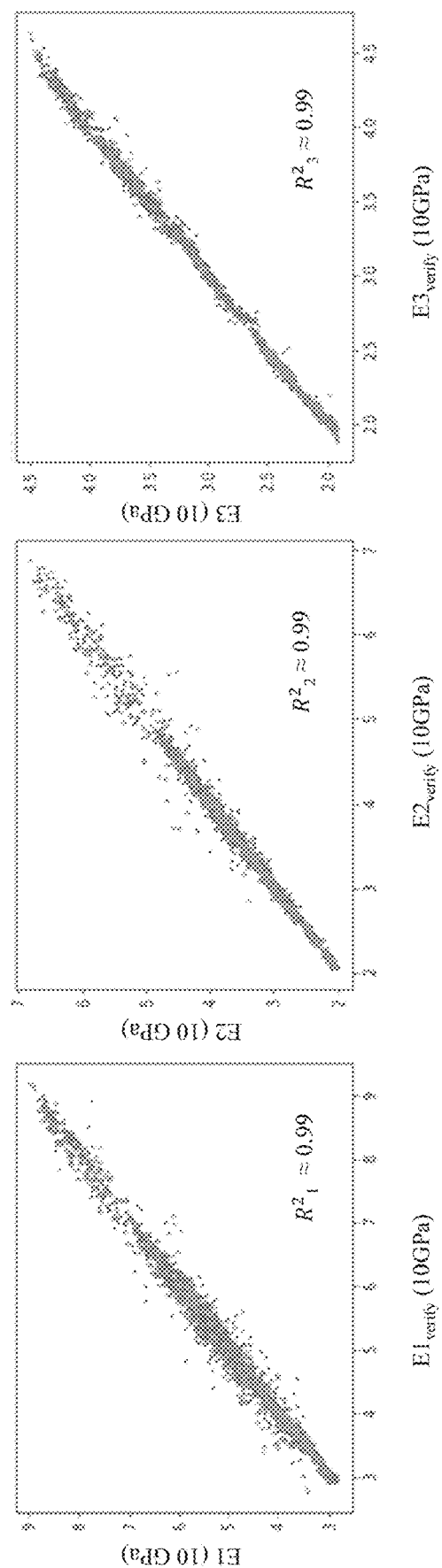
FIG. 5 is schematic diagrams of Young's modulus of predicted mechanical properties and Young's modulus of training mechanical properties according to some embodiments of the present disclosure.

Reference is made to FIG. 5. FIG. 5 is schematic diagrams of the Young's modulus E of the predicted mechanical properties $MP_P$ and the Young's modulus of training mechanical properties $MP_{train}$ according to some embodiments of the present disclosure.

In some embodiments, the predicted mechanical properties $MP_P$ are verified by the ABAQUS module 16 while on-line. When the predicted mechanical properties $MP_P$ of the FRP 22 are generated by the CNN model 151, the ABAQUS module 16 calculates mechanical properties $MP_{verify}$ of the FRP 22 to investigate reliability of the predicted mechanical properties $MP_P$.

In FIG. 5, the components E1, E2 and E3 of the Young's modulus E in x, y and z directions are illustrated with respect to the components $E1_{verify}$, $E2_{verify}$ and $E3_{verify}$ of the Young's modulus calculated by the ABAQUS module 16, respectively.

$R_1^2$ represents a coefficient of determination of E1 and $E1_{verify}$; $R_2^2$ represents a coefficient of determination of E2 and $E2_{verify}$; and $R_3^2$ represents a coefficient of determination of E3 and E3 verify. As illustrated in FIG. 5, the coefficients of determination $R_1^2$, $R_2^2$, and $R_3^2$ are about 0.99. Because the coefficients of determination $R_1^2$, $R_2^2$, and $R_3^2$ are almost equal to 1, the Young's modulus E of the predicted mechanical properties $MP_P$ in each direction is expected to be reliable.

Figure 6:
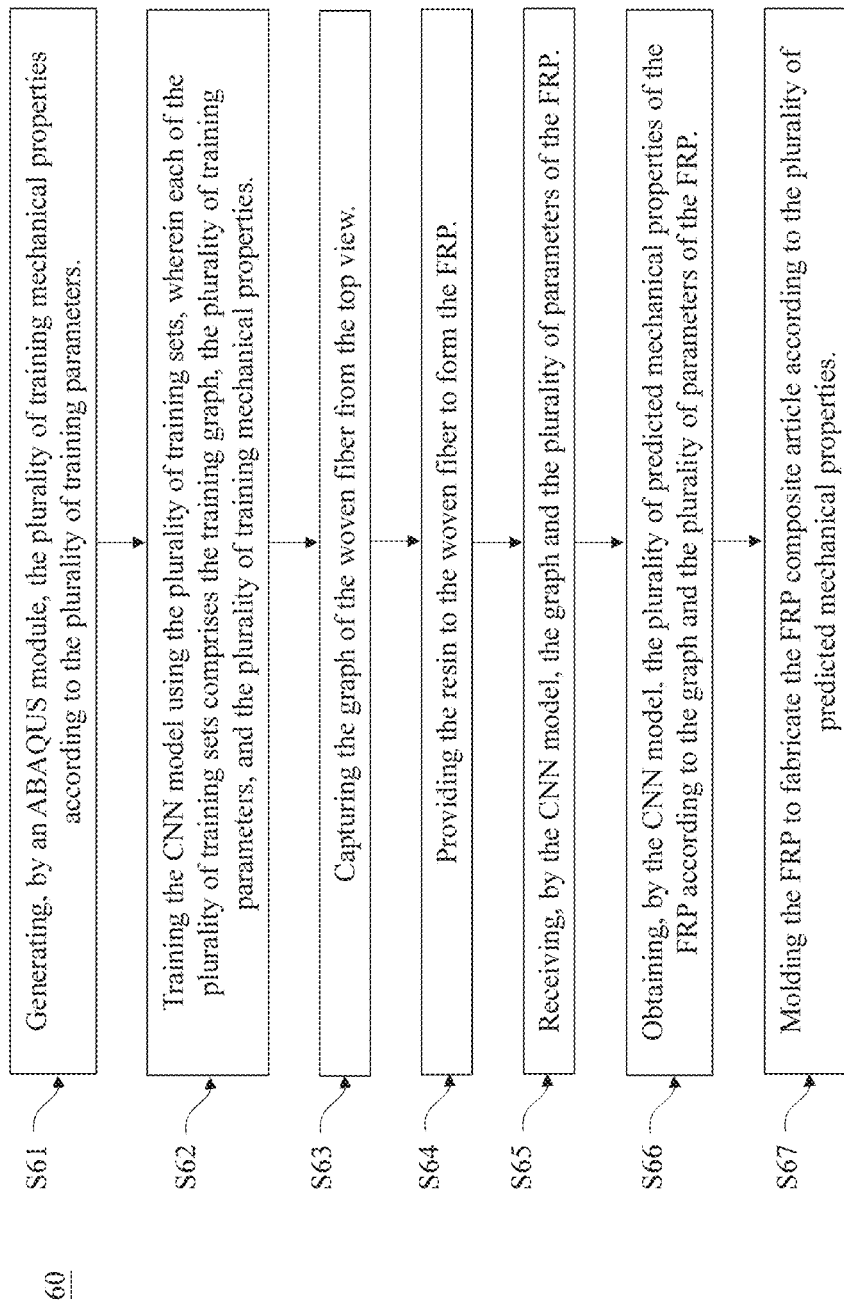
FIG. 6 is a flowchart of a molding method according to some embodiments of the present disclosure.

Reference is made to FIG. 6. FIG. 6 is a flowchart of a molding method 60 for fabricating the FRP composite article 23 according to some embodiments of the present disclosure. The molding method 60 includes operations S61, S62, S63, S64, S65, S66 and S67. In some embodiments, the molding method 60 is configured to be performed by the molding system 10. To facilitate understanding, the molding method 60 is described with respect to FIGS. 1 to 5.

In operation S61, the ABAQUS module 16 generates the plurality of training mechanical properties $MP_{train}$ according to the plurality of training parameters $P_{train}$. In some embodiments, before operation S61, the training woven fiber 30 and the training resin 31 are processed to form the training FRP 32.

In operation S62, the molding system 10 trains the CNN model 151 using the plurality of training sets N1 to Nn, wherein each of the training sets N1 to Nn includes the training graph $GR_{train}$, the plurality of training parameters $P_{train}$, and the plurality of training mechanical properties $MP_{train}$.

In operation S63, the detector 11 captures the graph GR of the woven fiber 20 from the top view. In operation S64, the resin dispenser 12 provides the resin 21 to the woven fiber 20 to form the FRP 22. In operation S65, the CNN model 151 receives the graph GR and the plurality of parameters $P_{CR}$ and $P_R$ of the FRP 22. In operation S66, the CNN model 151 obtains the plurality of predicted mechanical properties $MP_P$ of the FRP 22 according to the graph GR and the plurality of parameters $P_{CR}$ and $P_R$. In operation S67, the molding machine 13 molds the FRP 22 to fabricate the FRP composite article 23 according to the plurality of predicted mechanical properties $MP_P$.

Figure 7:
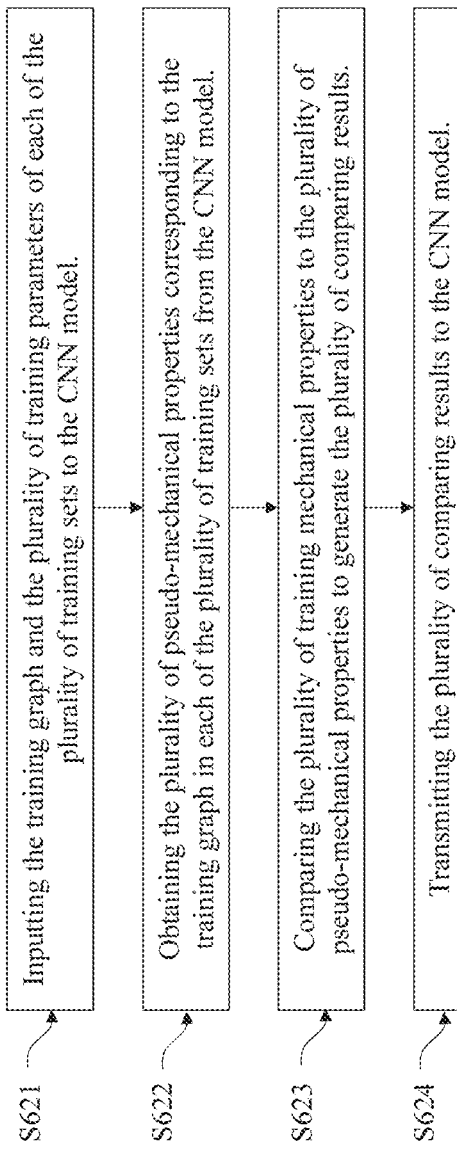
FIG. 7 is a flowchart of an operation of the molding method according to some embodiments of the present disclosure.

Reference is made to FIG. 7. FIG. 7 is a flowchart of operation S62 of the molding method 60 according to some embodiments of the present disclosure. Operation S62 of the molding method 60 includes operations S621, S622, S623, and S624.

In operation S621, the training graph $GR_{train}$ and the plurality of training parameters $MP_{train}$ of each of the plurality of training sets are inputted to the CNN model. In some embodiments, the training graph $GR_{train}$ is inputted by the controller 14, and the plurality of training parameters $MP_{train}$ are inputted by the ABAQUS module 16.

In operation S622, the plurality of pseudo-mechanical properties $MP_{pseudo}$ corresponding to the training graph $GR_{train}$ in each of the plurality of training sets N1 to Nn are obtained from the CNN model 151.

In operation S623, the comparing model 152 compares the plurality of training mechanical properties $MP_{train}$ to the plurality of pseudo-mechanical properties $MP_{pseudo}$ to generate the plurality of comparing results $C_{result}$.

In operation S624, the plurality of comparing results $C_{result}$ are transmitted to the CNN model 151.

The above molding method 60 is provided for illustrative purposes. Various operations of the molding method 60 are within the contemplated scope of the present disclosure. For example, in various embodiments, operation S64 can be performed after operation S65. For another example, the molding method 60 further includes an operation of verifying the training mechanical properties $MP_{train}$.

One aspect of the present disclosure provides a molding system for fabricating a FRP composite article. The molding system includes a detector, a resin dispenser, a processing module, and a molding machine. The detector is configured to capture a graph of a woven fiber from a top view. The resin dispenser is configured to provide a resin to the woven fiber to form a FRP. The processing module is configured to receive the graph and a plurality of parameters of the FRP. The processing module includes a convolutional neural network (CNN) model, and is configured to use the CNN model to obtain a plurality of predicted mechanical properties of the FRP according to the graph and the plurality of parameters of the FRP. The molding machine is configured to mold the FRP to fabricate the FRP composite article according to the plurality of predicted mechanical properties.

Another aspect of the present disclosure provides a molding method for fabricating a FRP composite article. The molding method includes operations of: capturing a graph of a woven fiber from a top view; providing a resin to the woven fiber to form a FRP; obtaining, by a CNN model, a plurality of predicted mechanical properties of the FRP according to the graph and a plurality of parameters of the FRP; and molding the FRP to fabricate the FRP composite article according to the plurality of predicted mechanical properties.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods and steps.

What is claimed is:

1. A molding system for fabricating a fiber reinforcement polymer (FRP) composite article, comprising:
   a detector, configured to capture a graph of a woven fiber from a top view;
   a resin dispenser, configured to provide a resin to the woven fiber to form a FRP;
   a processing module, configured to receive the graph and a plurality of parameters of the FRP, wherein the processing module comprises a convolutional neural network (CNN) model, and further configured to use the CNN model to obtain a plurality of predicted mechanical properties of the FRP according to the graph and the plurality of parameters of the FRP; and
   a molding machine, configured to mold the FRP to fabricate the FRP composite article according to the plurality of predicted mechanical properties,
   wherein the processing module is further configured to train the CNN model by using a plurality of training sets,
   wherein each of the plurality of training sets comprises a training graph, a plurality of training parameters, and a plurality of training mechanical properties.

2. The molding system of claim 1, further comprising:
   a controller, coupled to the molding machine, and configured to control the molding machine using the plurality of predicted mechanical properties to fabricate the FRP composite article.

3. The molding system of claim 1, wherein the plurality of parameters of the FRP comprise a material of the resin, a woven angle of the woven fiber, a width of a fiber of the woven fiber, a height of the fiber of the woven fiber, a temperature, and a pressure.

4. The molding system of claim 1, wherein the plurality of predicted mechanical properties comprise a predicted Young's modulus, a predicted shear modulus, a predicted Poisson's ratio ratio, and a predicted coefficient of thermal expansion of the FRP.

5. The molding system of claim 1, further comprising:
   an ABAQUS module, configured to generate the plurality of training mechanical properties according to the plurality of training parameters.

6. The molding system of claim 1, wherein the processing module is configured to input the plurality of training sets to the CNN model to train the CNN model, and obtain a plurality of pseudo-mechanical properties corresponding to the training graph in each of the plurality of training sets, respectively, from the CNN model.

7. The molding system of claim 6, wherein the processing module further comprises:
   a comparing model, configured to compare the plurality of training mechanical properties to the plurality of pseudo-mechanical properties, and transmit a plurality of comparing results to the CNN model to train the CNN model.

8. The molding system of claim 1, wherein the woven fiber is a woven carbon fiber.

9. The molding system of claim 1, wherein the woven fiber is a woven glass fiber.

10. A molding method for fabricating a fiber reinforcement polymer (FRP) composite article, comprising:
    capturing a graph of a woven fiber from a top view;
    providing a resin to the woven fiber to form a FRP;
    obtaining, by a convolutional neural network (CNN) model, a plurality of predicted mechanical properties of the FRP according to the graph and a plurality of parameters of the FRP; and molding the FRP to fabricate the FRP composite article according to the plurality of predicted mechanical properties, wherein the plurality of parameters of the FRP comprises a material of the resin, a woven angle of the woven fiber, a width of a fiber of the woven fiber, a height of the fiber of the woven fiber, a temperature, and a pressure, wherein the molding method further comprises:
  training the CNN model using a plurality of training sets, wherein each of the plurality of training sets comprises a training graph, a plurality of training parameters, and a plurality of training mechanical properties.

11. The molding method of claim 10, further comprising:
receiving, by the CNN model, the graph and the plurality of parameters of the FRP.

12. The molding method of claim 10, further comprising:
generating, by an ABAQUS module, the plurality of training mechanical properties according to the plurality of training parameters.

13. The molding method of claim 10, wherein training the CNN model by using the plurality of training sets comprises:
  inputting the training graph and the plurality of training parameters of each of the plurality of training sets to the CNN model; and
  obtaining a plurality of pseudo-mechanical properties corresponding to the training graph in each of the plurality of training sets from the CNN model.

14. The molding method of claim 13, wherein training the CNN model by using the plurality of training sets further comprises:
  comparing the plurality of training mechanical properties to the plurality of pseudo-mechanical properties to generate a plurality of comparing results, and
  transmitting the plurality of comparing results to the CNN model.

15. The molding method of claim 10, wherein the woven fiber is a woven carbon fiber.

16. The molding method of claim 10, wherein the woven fiber is a woven glass fiber.

17. A method for obtaining a plurality of predicted mechanical properties of a fiber reinforcement polymer (FRP) composite article, comprising:
  capturing a graph of a woven fiber from a top view;
  providing a resin to the woven fiber to form a FRP;
  training a convolutional neural network (CNN) model using a plurality of training sets, wherein each of the plurality of training sets comprises a training graph, a plurality of training parameters, and a plurality of training mechanical properties; and
  obtaining, by the CNN model, the plurality of predicted mechanical properties of the FRP according to the graph and a plurality of parameters of the FRP, wherein the plurality of parameters of the FRP comprises a material of the resin, a woven angle of the woven fiber, a width of a fiber of the woven fiber, a height of the fiber of the woven fiber, a temperature, and a pressure.

* * * * *